United States Patent
Seo

(10) Patent No.: US 9,797,317 B2
(45) Date of Patent: Oct. 24, 2017

(54) METHOD FOR CONTROLLING FUEL SWITCHING IN BI-FUEL VEHICLE

(71) Applicants: HYUNDAI MOTOR COMPANY, Seoul (KR); KIA MOTORS CORPORATION, Seoul (KR)

(72) Inventor: Yoo Jin Seo, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 210 days.

(21) Appl. No.: 14/726,407

(22) Filed: May 29, 2015

(65) Prior Publication Data
US 2016/0131049 A1    May 12, 2016

(30) Foreign Application Priority Data

Nov. 10, 2014  (KR) .................. 10-2014-0155353

(51) Int. Cl.
*F02D 19/06*     (2006.01)

(52) U.S. Cl.
CPC ..... *F02D 19/0615* (2013.01); *F02D 19/0628* (2013.01); *F02D 19/0647* (2013.01); *Y02T 10/36* (2013.01)

(58) Field of Classification Search
CPC ... Y02T 10/36; F02D 41/0025; F02D 19/081; F02D 19/0647; F02D 19/084; F02D 19/0694; F02D 19/08; F02D 19/087; F02D 19/0613; F02M 43/00; F02M 37/0064
USPC ................... 123/575, 576, 577, 578
See application file for complete search history.

(56) References Cited

U.S. PATENT DOCUMENTS

| | | | | |
|---|---|---|---|---|
| 2002/0194911 A1* | 12/2002 | Allegre | ............... | G01F 23/2927 73/293 |
| 2012/0143480 A1* | 6/2012 | Pursifull | ............. | F02D 19/0615 701/105 |
| 2013/0238226 A1* | 9/2013 | Slaymaker | ............ | F02D 41/065 701/113 |
| 2014/0245995 A1* | 9/2014 | Deliyski | ................ | F02M 69/50 123/456 |

(Continued)

FOREIGN PATENT DOCUMENTS

| | | |
|---|---|---|
| JP | 2005-240675 A | 9/2005 |
| JP | 2007-077918 A | 3/2007 |
| JP | 4300511 B2 | 7/2009 |

(Continued)

*Primary Examiner* — Sizo Vilakazi
(74) *Attorney, Agent, or Firm* — McDermott Will & Emery LLP

(57) ABSTRACT

A method for controlling fuel switching of a fuel switching system in a vehicle via a controller configured to receive one or more measured signals in order to issue a fuel shortage warning or in order to control fuel switching is disclosed. The system includes an LPG rail pressure sensor for measuring a pressure in an LPG rail, and a bombe pressure sensor for measuring a pressure in the bombe. The method includes a first LPG rail pressure determining step of determining whether the pressure in the LPG rail is lower than a second reference value or not and a first bombe pressure determining step of determining whether the pressure in the bombe is lower than a third reference value or not. If at least one of the first pressure determining steps is positive, the method further includes switching the fuel to gasoline.

9 Claims, 3 Drawing Sheets

(56) References Cited

U.S. PATENT DOCUMENTS

2016/0138497 A1* 5/2016 Seo .................... F02D 41/0025
123/525

FOREIGN PATENT DOCUMENTS

| JP | 2009-262907 A | 11/2009 |
| JP | 2013-113268 A | 6/2013 |
| KR | 10-2003-0049429 A | 6/2003 |

* cited by examiner

METHOD FOR CONTROLLING FUEL SWITCHING IN BI-FUEL VEHICLE

CROSS-REFERENCE TO RELATED APPLICATION

This application claims the benefit of priority to Korean Patent Application No. 10-2014-0155353 filed in the Korean Intellectual Property Office on Nov. 10, 2014, the entire contents of which are incorporated herein by reference.

TECHNICAL FIELD

The present invention relates to a method for controlling fuel switching in a bi-fuel fuel vehicle. More particularly, the present invention relates to a method for controlling fuel switching by utilizing a pressure in an LPG rail and a pressure in a bombe.

BACKGROUND

Recently, the bi-fuel vehicle has been under development for using gasoline and a gas at the same time. As the gas, there are CNG (Compressed Natural Gas) and LPG (Liquid Petroleum Gas). The bi-fuel vehicle is provided with a gasoline fuel system and an LPG fuel system. The bi-fuel vehicle controls the gasoline fuel system and the LPG fuel system with an ECU (engine controller) for selective switching from the gasoline to the LPG or vice versa.

In general, the bi-fuel vehicle drives an engine with the gasoline fuel at the time of starting, and drives the engine with the LPG fuel at the time of running after switching from the gasoline fuel to the LPG fuel.

Manual fuel switching and automatic fuel switching at the time of fuel shortage are available for the bi-fuel vehicle of the gasoline and the LPG at will of a driver of the vehicle.

In general, after noticing a fuel shortage warning, while the driver of a mono-fuel vehicle tends to keep running while risking an engine stop at will of the driver, the driver of the bi-fuel vehicle tends to consume inexpensive LPG to the maximum to a range below which the fuel can be measured.

As a countermeasure for safety on starting off during running, the ECU permits use of LPG only up to a range at which an LPG level sensor can measure an LPG level in the LPG bombe, and then performs automatic fuel switching to gasoline with a slight margin on top of a minimum measurable value into account.

Therefore, use of LPG below the minimum measurable value is not possible by using such a fuel switching control method of the bi-fuel vehicle.

The above information disclosed in this Background section is only for enhancement of understanding of the background of the invention and therefore it may contain information that does not form the prior art that is already known in this country to a person of ordinary skill in the art.

SUMMARY

Embodiments of the present invention have been made in an effort to provide a method for controlling fuel switching in a bi-fuel vehicle having advantages of maximally maintaining running on LPG before fuel switching, not with a cost increase, but rather with a cost decrease.

An object of embodiments of the present invention is to provide a method for controlling fuel switching in a bi-fuel fuel vehicle, in which measured values of an existing LPG fuel vehicle are utilized such that the LPG fuel vehicle measures a pressure in an LPG rail and a pressure in a bombe for determining an LPG injection rate and LPG composition for maximally maintaining running on LPG before fuel switching, not without a cost increase, but with a cost decrease.

In certain embodiments of the present invention, a method for controlling fuel switching of a fuel switching system in a vehicle via a controller configured to receive one or more measured signals in order to issue a fuel shortage warning or in order to control fuel switching is disclosed. In these embodiments, the fuel switching system includes an LPG level sensor for measuring an LPG level in a bombe, an LPG rail pressure sensor for measuring a pressure in an LPG rail, a bombe pressure sensor for measuring a pressure in the bombe The method includes determining whether the LPG level is lower than a first reference value or not. If the LPG level is higher than the first reference value, running of the vehicle on LPG is maintained. If the LPG level is lower than the first reference value, the method for controlling fuel switching further includes a first LPG rail pressure determining step of determining whether the pressure in the LPG rail is lower than a second reference value or not, and a first bombe pressure determining step of determining whether the pressure in the bombe is lower than a third reference value or not.

In certain embodiments, the method further includes switching the fuel to gasoline when either one of the first pressure determining steps is positive.

In certain embodiments, the method may further include, if both of the first pressure determining steps are negative, a second LPG rail pressure determining step of determining whether a pressure change in the LPG rail is larger than a fourth reference value or not, and a second bombe pressure determining step of determining whether a pressure change in the bombe is larger than a fifth reference value or not.

In certain embodiments, when at least one of the second pressure determining steps is positive, the fuel may be switched to gasoline.

In certain embodiments, if both of the second pressure determining steps are negative, running of the vehicle on LPG may be maintained.

In certain embodiments, the method may further include warning the vehicle driver of LPG shortage if the LPG level is lower than the first reference value.

In certain embodiments of the present invention, a method for controlling fuel switching of a fuel switching system in a vehicle via a controller configured to receive one or more measured signals in order to issue a fuel shortage warning or in order to control fuel switching is disclosed. In these embodiments, the system includes an LPG rail pressure sensor for measuring a pressure in an LPG rail and a bombe pressure sensor for measuring a pressure in a bombe. The method includes a first LPG rail pressure determining step of determining whether the pressure in the LPG rail is lower than a second reference value or not, and a first bombe pressure determining step of determining whether the pressure in the bombe is lower than a third reference value. If at least one of the first pressure determining steps is positive, the fuel is switched to gasoline. In certain embodiments, the method may further include, if both of the first pressure determining steps are negative, a second LPG rail pressure determining step of determining whether a pressure change in the LPG rail is larger than a fourth reference value or not, and a second bombe pressure determining step of determining whether a pressure change in the bombe is larger than a fifth present value or not.

In certain embodiments, if at least one of the second pressure determining steps is positive, the fuel may be switched to gasoline. In certain embodiments, if both of the second pressure determining steps are negative, running of the vehicle on LPG may be maintained.

In certain embodiments, method may further include, if at least one of the first pressure determining steps is positive, warning the vehicle driver of a shortage of LPG A fuel switching system in a vehicle may include a bombe, an LPG rail, an LPG rail pressure sensor for measuring a pressure in the LPG rail, a bombe pressure sensor for measuring a pressure in the bombe, and a controller. The controller may be configured to determine whether or not the pressure in the LPG rail is lower than a second reference value, determine whether or not the pressure in the bombe is lower than a third reference value, and run the vehicle on gasoline if the pressure in the LPG rail is lower than the second reference value or if the pressure in the bombe is lower than the third reference value.

DETAILED DESCRIPTION

Hereafter, embodiments of the present invention will be described with reference to the accompanying drawings such that persons skilled in this field of art can easily carry out embodiments of the present invention.

Because an embodiment, may be embodied in different modes by persons skilled in this field of art, the scope of the present invention is not limited to the embodiments described hereafter.

Throughout the specification, unless explicitly described to the contrary, the word "comprise" and variations such as "comprises" or "comprising" will be understood to imply the inclusion of stated elements but not the exclusion of any other elements. Moreover, a name of an element does not limit a function of the element.

Figure 1:
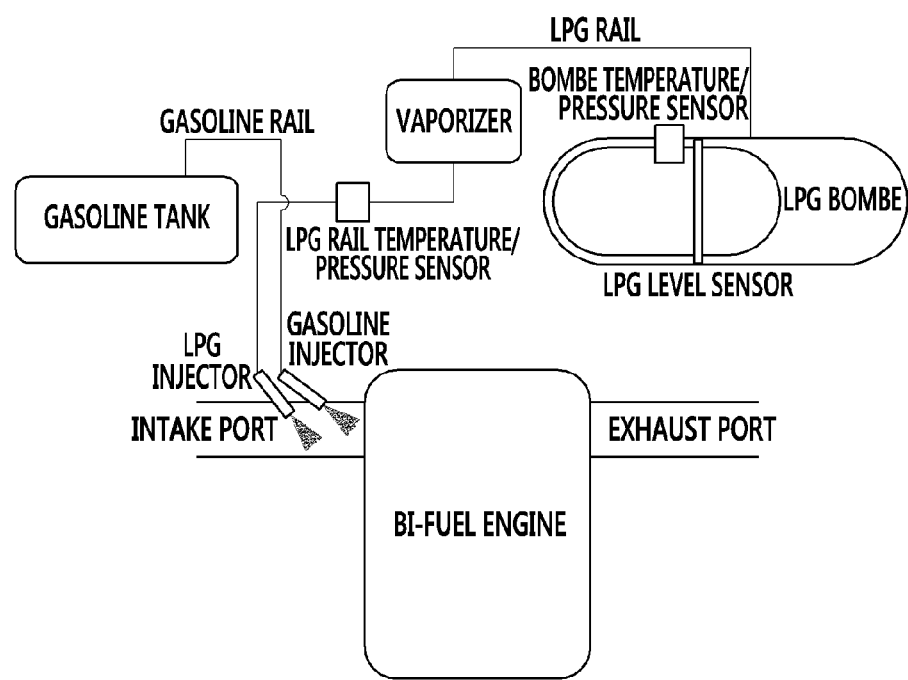
FIG. 1 illustrates a block diagram of a bi-fuel system in a bi-fuel vehicle in accordance with an embodiment of the present invention.

FIG. 1 illustrates a block diagram of a bi-fuel system in a bi-fuel vehicle in accordance with an embodiment of the present invention.

Figure 2:
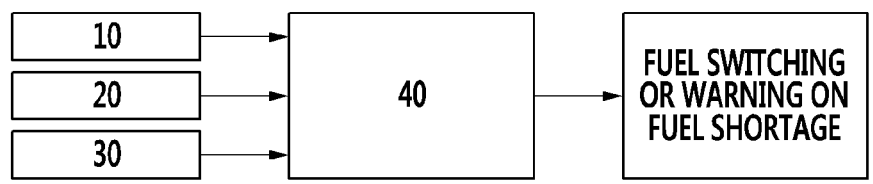
FIG. 2 illustrates a block diagram of a fuel switching system in accordance with an embodiment of the present invention.

FIG. 2 illustrates a block diagram of a fuel switching system in accordance with an embodiment of the present invention.

Referring to FIGS. 1 and 2, the bi-fuel system in a bi-fuel vehicle may include an LPG level sensor 10 for measuring an LPG level in a bombe, an LPG rail pressure sensor 20 for measuring a pressure in an LPG rail, a bombe pressure sensor 30 for measuring a pressure in the bombe, and a controller 40 configured to receive one or more measured signals in order to issue a fuel shortage warning or in order to control fuel switching. The controller 40 may be an engine control unit (ECU).

Figure 3:
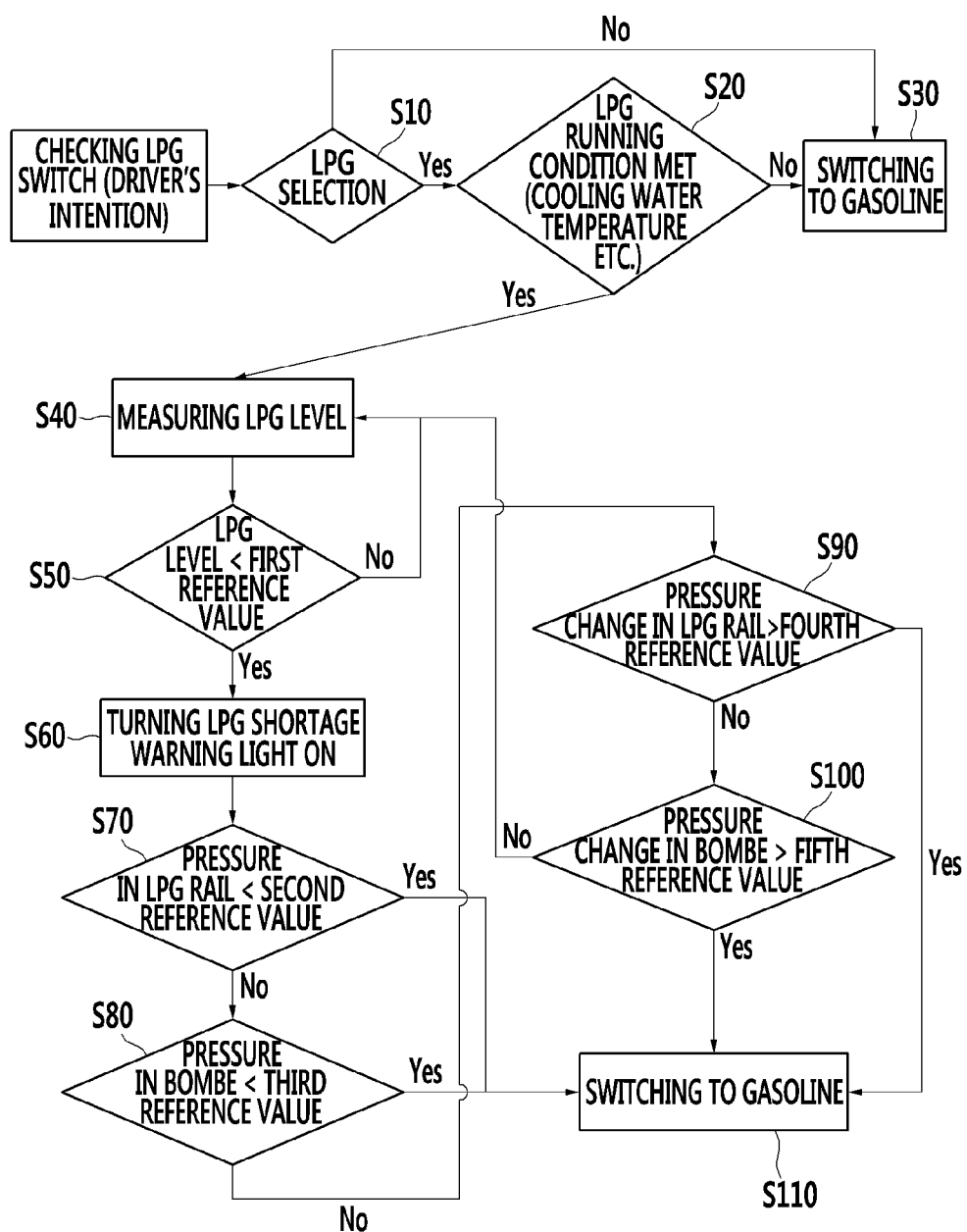
FIG. 3 illustrates a flowchart showing the steps of a method for controlling a fuel switching system in accordance with an embodiment of the present invention.

FIG. 3 illustrates a flowchart showing the steps of a method for controlling a fuel switching system in accordance with an embodiment of the present invention. The method steps may generally be carried out by the controller 40.

Referring to FIG. 3, in a first embodiment, the method for controlling fuel switching includes a step S50 for determining whether an LPG level is lower than a first reference value or not. If the LPG level is higher than the first reference value, the running of the vehicle on LPG is maintained. If the LPG level is lower than the first reference value, the method for controlling fuel switching may further include a first LPG rail pressure determining step S70 of determining whether a pressure in an LPG rail is lower than a second reference value or not, and a first bombe pressure determining step S80 for determining whether a pressure in a bombe is lower than a third reference value or not.

In certain embodiments, the method for controlling fuel switching may begin with a step S10 for running the vehicle on LPG or gasoline at will of the driver before performing the above steps. If the driver selects running the vehicle on LPG, the method for controlling fuel switching may proceed to a step S40 for measuring an LPG level with the LPG level sensor 10 if conditions regarding the running of the vehicle on LPG are met in a step S20 by the controller 40.

If the driver selects running the vehicle on gasoline, or the conditions on running the vehicle on LPG are not met in the step S20, the controller 40 maintains running the vehicle on gasoline or switches to running the vehicle on gasoline S30.

In certain embodiments, the first reference value in the step S50 may be a minimum measured value of a measurable LPG level with the LPG level sensor 10 with some margin added.

The first pressure determining steps S70 and S80 include a first LPG rail pressure determining step S70 of determining whether the pressure in the LPG rail is lower than the second reference value or not, and a first bombe pressure determining step S80 of determining if a pressure in the bombe is lower than the third reference value or not, wherein an order of steps S70 and S80 may be interchanged.

The second reference value and the third reference value may be set with a plurality of experiments.

In certain embodiments, in the method for controlling fuel switching at a moment when either one of the first pressure determining steps S70 and S80 is positive, the fuel may be switched to gasoline S110 by the controller 40. That is, when at least one of the first pressure determining steps S70 and S80 is positive, the fuel may be switched to gasoline S110 by the controller 40. In certain embodiments, both of the first pressure determining steps S70 and S80 are performed.

If both of the first pressure determining steps S70 and S80 are negative, the method for controlling fuel switching may further include a second LPG rail pressure determining step S90 for determining whether a pressure change in the LPG rail is larger than a fourth reference value or not, and a second bombe pressure determining step S100 for determining whether a pressure change in the bombe is larger than a fifth reference value or not by the controller 40.

In certain embodiments, the fourth reference value and the fifth reference value may be set with a plurality of experiments, and the pressure change measuring method is apparent to persons skilled in this field of art, so detailed description thereof will be omitted.

An order of the second pressure determining steps S90 and S100 may be interchanged.

In the method for controlling fuel switching, when either one of the second pressure determining steps S90 and S100 is positive, the controller 40 may switch the fuel to gasoline S110. That is, when at least one of the second pressure determining steps S90 and S100 is positive, the controller 40 may switch the fuel to gasoline S110. In certain embodiments, both of the second pressure determining steps S90 and S100 are performed.

If both of the second pressure determining steps S90 and S100 are negative, in the method for controlling fuel switching, the running of the vehicle on LPG may be maintained by the controller 40. In this case, steps from the step S40 may proceed.

Referring to FIG. 3, the method for controlling fuel switching in accordance with certain embodiments of the present invention may further include a step S60 for warning of LPG shortage to the vehicle driver by the controller 40 if the LPG level is lower than the first reference value.

In other embodiments, the method for controlling fuel switching in accordance with an embodiment of the present invention may be carried out without the LPG level sensor 10. By removing the LPG level sensor 10, cost may be saved.

In these embodiments, since an LPG vehicle has the LPG rail pressure sensor 20 and the bombe pressure sensor 30, the LPG vehicle measures the pressure in the LPG rail and the pressure in the bombe.

According to embodiments of the present invention, it is possible to determine whether the LPG level reaches the automatic fuel switching level or not with the LPG rail pressure sensor 20 and the bombe pressure sensor 30, and by carrying out the steps S70, S80, S90, and S100 in FIG. 3 with repeated experiments which are apparent to persons skilled in this field of art, an object of the present invention may be achieved. Thus, an LPG level sensor 10 may not be necessary in certain embodiments.

A method for controlling fuel switching without the LPG level sensor 10 in accordance with another embodiment of the present invention will now be described.

The fuel switching system includes the LPG rail pressure sensor 20, the bombe pressure sensor 30, and the controller 40. The steps from S10 to S30 in FIG. 3 are the same in the method for controlling fuel switching without the LPG level sensor 10 in accordance with the current embodiment of the present invention, In embodiments without an LPG level sensor 10, the step S50 is replaced with steps S70 and S80. Accordingly, the step S50 is removed from FIG. 3, and the step S70 is carried out after the step S40. It is to be noted that the method does not require steps S10 to S30 in all embodiments.

The method for controlling fuel switching without the LPG level sensor 10 in accordance with the certain embodiments of the present invention includes a first LPG rail pressure determining step S70 for determining, by the controller 40, whether a pressure in an LPG rail is lower than a second reference value or not, and a first bombe pressure determining step S80 for determining, by the controller 40, whether a pressure in a bombe is lower than a third reference value. If at least one of the first pressure determining steps S70 and S80 is positive, the fuel may be switched to gasoline S110 by the controller 40.

Even though the terms of the second reference value and the third reference value in embodiments without an LPG level sensor 10 are the same as the terms of the reference values used in the embodiments including an LPG level sensor 10, the values of the second reference value and the third reference in different embodiments may be different, because the terms are required to be set appropriately with a plurality of experiments for the controller 40 to determine (S50 in FIG. 3) that the LPG level reaches the automatic switching level without the LPG level sensor.

If both of the first pressure determining steps S70 and S80 are negative, the method for controlling fuel switching without the LPG level sensor 10 in accordance with the current embodiment of the present invention may further include a second LPG rail pressure determining step S90 for determining whether a pressure change in the LPG rail is larger than a fourth reference value or not by the controller 40, and a second bombe pressure determining step S100 for determining whether a pressure change in the bombe is larger than a fifth present value or not by the controller 40.

In the method for controlling fuel switching without the LPG level sensor 10 in accordance with the current embodiment of the present invention, if at least one of the second pressure determining steps S90 and S100 is positive, the fuel is switched to gasoline S110 by the controller 40.

If both of the second pressure determining steps S90 and S100 are negative, the running of the vehicle on LPG is maintained by the controller 40.

In a case of the foregoing embodiment as well, if at least one of the first pressure determining steps S70 and S80 are positive, the method for controlling fuel switching without the LPG level sensor 10 in accordance with the current preferred embodiment of the present invention may also include a step S60 for warning the vehicle driver of a shortage of LPG by the controller 40. In this case, since in certain embodiments, steps S70 and S80 take the place of step S50, the LPG level sensor may be removed in these embodiments.

Thus, embodiments of the present invention permit maintaining of the running of the vehicle on LPG, not only even below the minimum measurable value of the LPG level sensor, but also even if the LPG level sensor is out of order, and removal of the LPG level sensor for cost saving.

While embodiments of this invention have been described above, it is to be understood that the invention is not limited to the disclosed embodiments. On the contrary, it is intended to cover various modifications and equivalent arrangements included within the spirit and scope of the appended claims.

What is claimed is:

1. A method for controlling fuel switching of a fuel switching system in a vehicle via a controller configured to receive one or more measured signals in order to issue a fuel shortage warning or in order to control fuel switching, the fuel switching system including an LPG level sensor for measuring an LPG level in a bombe, an LPG rail pressure sensor for measuring a pressure in an LPG rail, and a bombe pressure sensor for measuring a pressure in the bombe, the method comprising:

determining whether the LPG level is lower than a first reference value or not;

maintaining running of the vehicle on LPG if the LPG level is higher than the first reference value;

a first LPG rail pressure determining step of determining whether the pressure in the LPG rail is lower than a second reference value or not if the LPG level is lower than the first reference value;

a first bombe pressure determining step for determining whether the pressure in the bombe is lower than a third reference value or not if the LPG level is lower than the first reference value; and switching the fuel to gasoline when either one of the first LPG rail pressure determining step and the first bombe pressure determining step is positive, wherein, if both of the first LPG rail pressure determining step and the first bombe pressure determining step are negative, the method further comprises:

a second LPG rail pressure determining step of determining whether a pressure change in the LPG rail is larger than a fourth reference value or not; and a second bombe pressure determining step of determining whether a pressure change in the bombe is larger than a fifth reference value or not.

2. The method of claim 1, further comprising switching the fuel to gasoline when at least one of the second LPG rail pressure determining step and the second bombe pressure determining step is positive.

3. The method of claim 2, further comprising, maintaining running of the vehicle on LPG if both of the second LPG rail pressure determining step and the second bombe pressure determining step are negative.

4. The method of claim 1, further comprising warning a vehicle driver of LPG shortage if the LPG level is lower than the first reference value.

5. A method for controlling fuel switching of a fuel switching system in a vehicle via a controller configured to receive one or more measured signals in order to issue a fuel shortage warning or in order to control fuel switching, the fuel switching system including an LPG rail pressure sensor for measuring a pressure in an LPG rail, and a bombe pressure sensor for measuring a pressure in a bombe, the method comprising:

a first LPG rail pressure determining step of determining whether the pressure in the LPG rail is lower than a first reference value or not;

a first bombe pressure determining step of determining whether the pressure in the bombe is lower than a second reference value; and switching the fuel to gasoline if at least one of the first pressure determining steps is positive, wherein, if both of the first LPG rail pressure determining step and the first bombe pressure determining step are negative, the method further comprises:

a second LPG rail pressure determining step of determining whether a pressure change in the LPG rail is larger than a third reference value or not; and a second bombe pressure determining step of determining whether a pressure change in the bombe is larger than a fourth present value or not.

6. The method of claim 5, further comprising switching the fuel to gasoline, if at least one of the second LPG rail pressure determining step and the second bombe pressure determining step is positive.

7. The method of claim 6, further comprising, maintaining running of the vehicle on LPG if both of the second LPG rail pressure determining step and the second bombe pressure determining step are negative.

8. The method of claim 5, further comprising, if at least one of the first LPG rail pressure determining step and the first bombe pressure determining step is positive, warning a vehicle driver of a shortage of LPG.

9. A fuel switching system in a vehicle, the fuel switching system comprising:

a bombe;

an LPG rail;

an LPG rail pressure sensor for measuring a pressure in the LPG rail;

a bombe pressure sensor for measuring a pressure in the bombe; and a controller configured to perform a first LPG rail pressure determining step of determining whether or not the pressure in the LPG rail is lower than a first reference value, perform a first bombe pressure determining step of determining whether or not the pressure in the bombe is lower than a second reference value, and switch the fuel to gasoline if the pressure in the LPG rail is lower than the first reference value or if the pressure in the bombe is lower than the second reference value, wherein, if both of the first LPG rail pressure determining step and the first bombe pressure determining step are negative, the controller is further configured to perform:

a second LPG rail pressure determining step of determining whether a pressure change in the LPG rail is larger than a third reference value or not; and a second bombe pressure determining step of determining whether a pressure change in the bombe is larger than a fourth present value or not.

* * * * *